Feb. 12, 1952
J. H. HIRSCH
2,585,462
CATALYTIC APPARATUS
Filed Dec. 19, 1947
2 SHEETS—SHEET 1
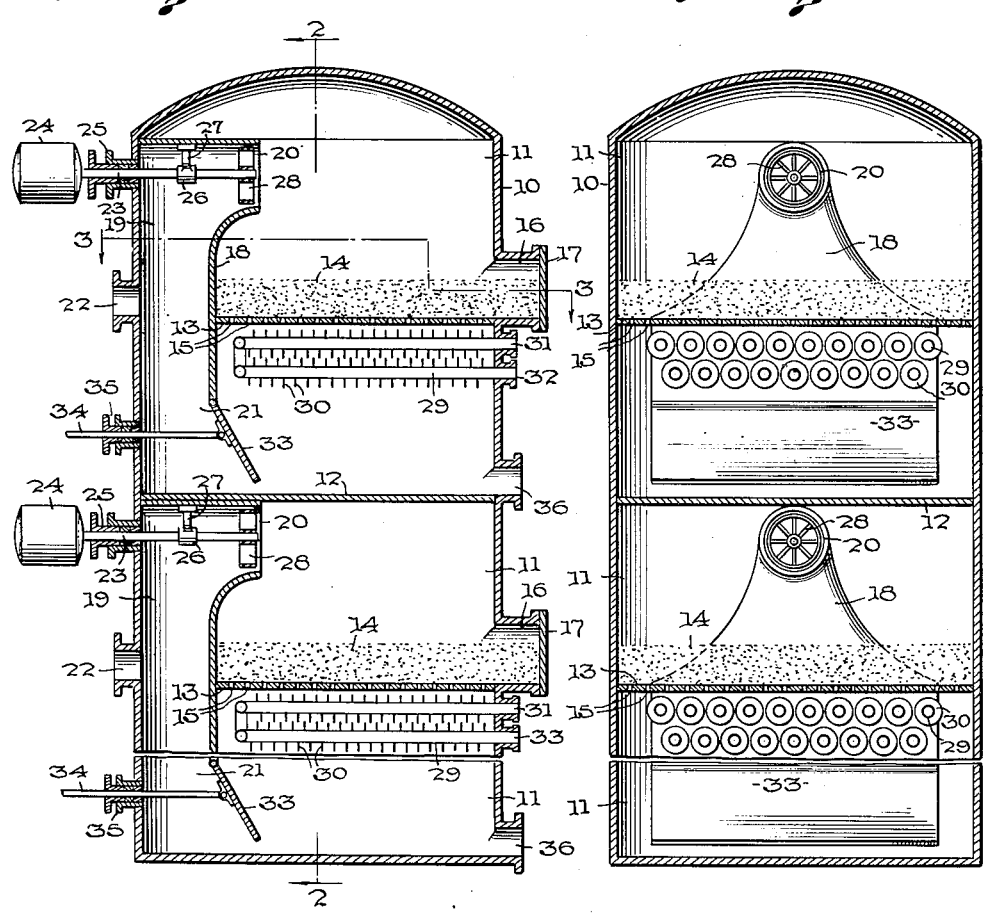
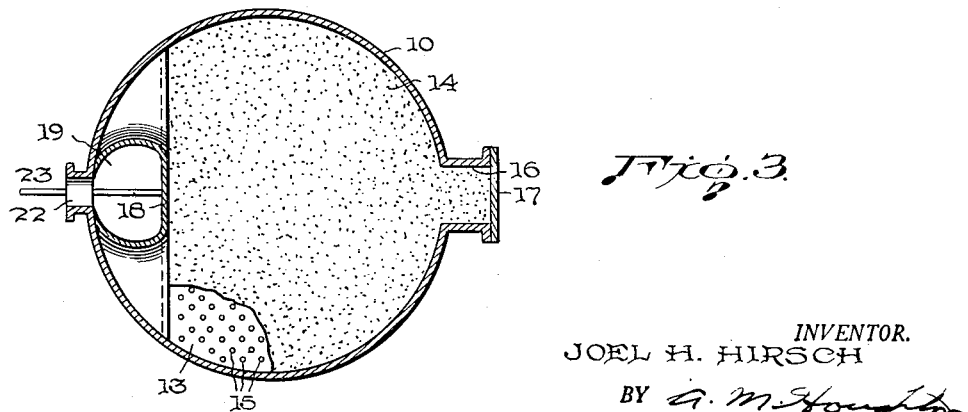
INVENTOR.
JOEL H. HIRSCH
BY
his ATTORNEY

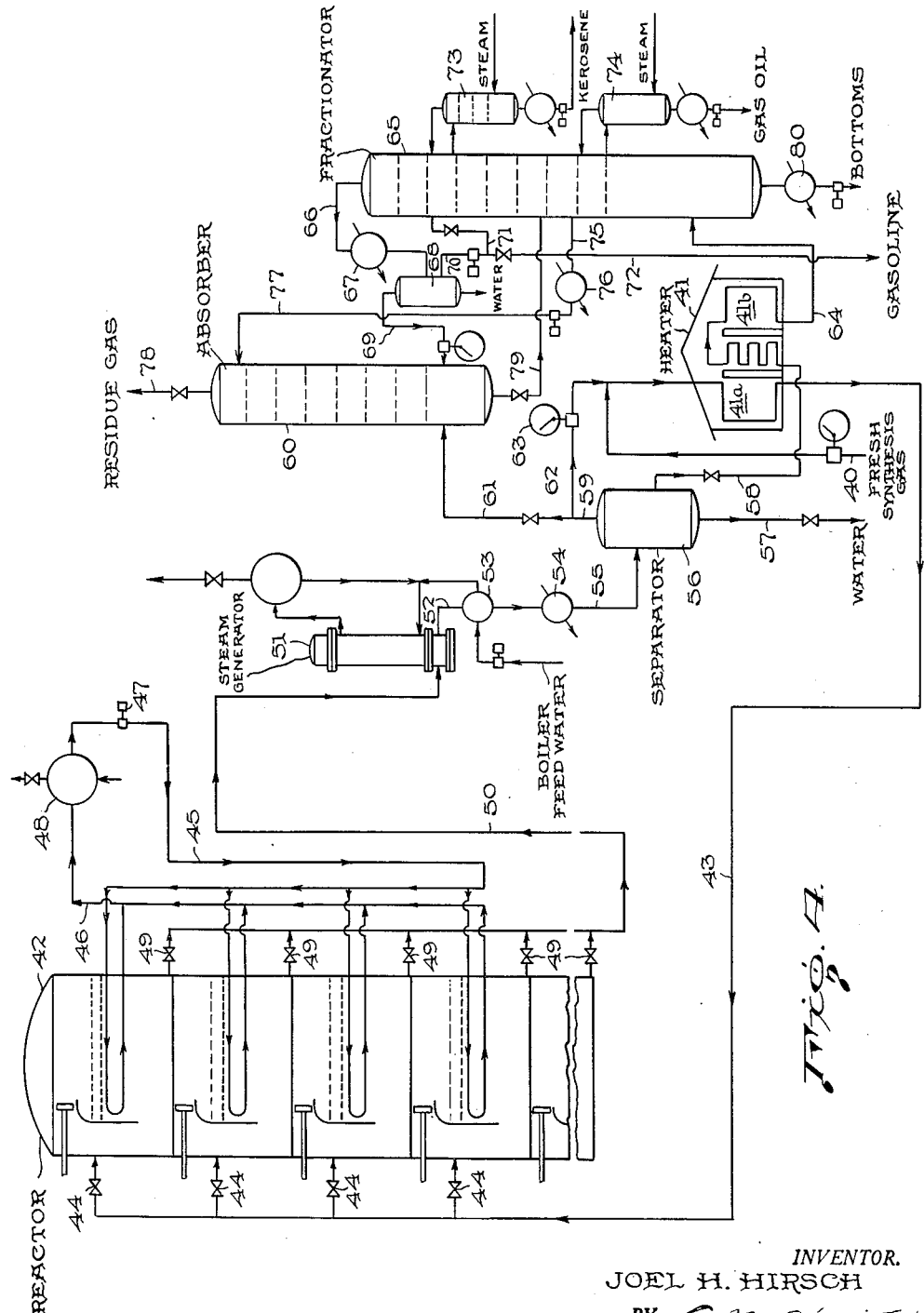

Patented Feb. 12, 1952

2,585,462

UNITED STATES PATENT OFFICE 2,585,462

CATALYTIC APPARATUS

Joel H. Hirsch, Oakmont, Pa., assignor to Gulf Research & Development Company, Pittsburgh, Pa., a corporation of Delaware Application December 19, 1947, Serial No. 792,825

7 Claims. (Cl. 23—288)

This invention relates to an improved method for carrying out certain types of chemical reactions and to apparatus especially adapted for use in such process. More particularly, it relates to an improved method for carrying out chemical reactions wherein a fluid, either liquid or gaseous, is contacted with a fixed bed of solid catalyst, and to a chemical reactor within which such process may advantageously be carried out.

In the conduct of catalytic chemical reactions, particularly on a large scale, serious problems are encountered when the particular reaction involved either liberates or absorbs large quantities of heat. In the former case, i. e., when large amounts of heat are liberated in exothermic reactions, the control of the reaction temperature is made particularly difficult by the fact that the solid catalyts employed are ordinarily poor conductors of heat. Various means have been employed in the art to remove or supply heat to a catalytic chemical reaction, such as the circulation of heat transfer fluids through tubes embedded in the catalyst in the reaction zone, but such means have not proved entirely satisfactory.

The synthesis of normally liquid hydrocarbons from hydrogen and carbon monoxide is typical of a number of catalytic reactions which are exothermic in nature and whose success depends upon avoiding an excessive increase in reaction temperature within the catalyst bed. It has been proposed with respect to this process that the heat of reaction be removed and the temperature thereby controlled by recirculating relatively large quantities of the synthesis gas while cooling it at some point in the circuit. However, such procedure entails a large energy loss when employing customary methods of recirculating large quantities of gases through the necessary conduits. Thus, a considerable portion of the work required in moving the gases through the system is expended in circulating the gases through the conduits leading to and from the actual reaction zone rather than in forcing them through the catalyst bed. Furthermore, such a method requires long and extensive piping, external coolers, compressors and the like, all of which increase the cost of circulating the gases.

It is accordingly an object of the present invention to provide means for carrying out exothermic and endothermic catalytic chemical reactions in such manner as to minimize the work required to circulate large quantities of fluids for controlling the temperature of the reaction. Another object is to provide means for reducing the relatively large pressure-drop associated with chemical process systems in which fluid reactants are circulated externally of a reaction zone. A further object is to provide apparatus for carrying out catalytic chemical reactions whereby the reaction temperature may readily be maintained within desired limits. A still further object is to provide an improved process for the synthesis of normally liquid hydrocarbons from carbon monoxide and hydrogen. Other objects will be apparent from the following detailed description of the invention, and various advantages not specifically referred to herein will become apparent to those skilled in the art upon employment of the invention in practice.

According to the present invention, the above and related objects are achieved in a process and apparatus whereby fluid reactants are contacted with one or more fixed beds of catalyst each of which has associated with it heat exchange means and independently operating circulating means for moving the fluid reactants through the catalyst bed and over heat exchange means back to the circulating means, all disposed within a single reaction vessel. Such process and apparatus for accomplishing the same may be more readily understood by reference to the attached drawings, wherein:

Figure 1 is an elevational view in cross-section of one embodiment of the apparatus provided by the invention.

Figure 2 is a sectional view along line 2—2 of Figure 1 in the direction of the arrows.

Figure 3 is a sectional view along line 3—3 of Figure 1 in the direction of the arrows.

Figure 4 is a schematic diagram illustrating the process provided by the invention as applied to the synthesis of normally liquid hydrocarbons from carbon monoxide and hydrogen employing the apparatus shown in Figures 1, 2, and 3.

Referring now to Figures 1, 2, and 3, wherein like numerals refer to like parts, there is shown a closed cylindrical shell 10 which is preferably in a vertical position. This closed shell comprises a reaction vessel which may, if desired, be constructed of a pressure-resistant material. The shell is divided into a number of compartments 11 by separating members 12 disposed within the shell along its length. The number of comyartments so defined may vary depending upon the desired capacity of the entire reactor. Disposed within each of the compartments 11 is a support 13 for a catalyst bed 14. The catalyst support 13 is provided with openings or perforations 15 and may be a grid, grating, screen, or perforated plate or tray. The shell 10 is provided with manholes 16 disposed adjacent to each of the catalyst beds 14 for charging and discharging catalyst to each of the compartments 11. Removable closures 17 seal off manholes 16 during operation of the reactor.

The catalyst support 13 extends from the wall of the reactor 10 to the wall 18 of a duct 19, thus dividing each compartment into upper and lower portions. As shown in Figure 1, the duct 19 extends from the lower portion to the upper portion of each compartment and preferably extends horizontally into the upper portion of each compartment. As shown more clearly in Figure 2, in front elevation, the duct is preferably in the form of an inverted funnel having a narrow opening 20 in its upper end and a flared opening 21 in its lower end. Feed inlets 22 extend through the shell 10 into each of the ducts.

Within each of compartments 11 fluids are circulated from below the catalyst bed through the duct 19 to the upper portion of the compartment by fluid circulating means or blowers provided as follows: Extending through the shell 10 adjacent the top of each compartment is a drive shaft 23 connected to a motor or other prime mover 24. Where the shaft 23 passes through the shell 10, a stuffing box 25 is provided. The shaft is journaled in a suitable bearing 26 mounted in a supporting member 27. Mounted on the end of the shaft within duct 19 and adjacent to the opening thereof is an impeller of the centrifugal type having blades 28. The fluid circulating means or blower thus provided produces a pressure head over the catalyst bed 14 equivalent to the pressure lost by the circulating fluids in their passage from the circulating means through the catalyst bed 14 and back through duct 19 to the circulating means.

Within each of the compartments 11 and preferably immediately below catalyst support 13 there is provided heat exchange means, suitably a tubular heat exchanger in the form of one or more flat coils. The heat exchanger is composed of tubes 29 preferably provided with fins 30. The fins are preferably arranged in a transverse or spiral location around the tubes, thus permitting nesting of the tubes. This construction permits securing the maximum amount of heat transfer surface within the desired space, and also permits cooling the fluids passing over the heat exchanger with a minimum of mechanical energy loss. The heat exchanger is provided with an inlet 31 and an outlet 32 leading through the shell 10 to means, not shown, for circulating a heat transfer medium through the tubes of the heat exchanger. Such heat transfer medium may be water or any other suitable heat transfer fluid.

Attached at the bottom of wall 18 of the duct 19 is a hinged vane or damper 33 which serves to regulate the flow of fluids from the bottom of compartment 11 up through duct 19 to the circulating means. Damper 33 is actuated by shaft 34 which extends through shell 10 through a stuffing box 35 to an actuating means not shown. Such actuating means may be manually controlled or it may be controlled by means responsive to the temperature within the catalyst bed.

An outlet 36 is provided for each of compartments 11 and is preferably located immediately adjacent the separating member 12 to permit ready withdrawal of liquid products.

In operation, fluid reactants are introduced into duct 19 within each of the compartments 11 through inlet 22. Within duct 19 the fluid reactants become mixed with the recirculated fluid being drawn up through the duct by the circulating means. The resultant mixture passes upwardly through the duct and is discharged into the upper part of compartment 11 and down through the catalyst bed 14 by the circulating means. The reaction products plus unreacted fluids pass through the perforations 15 in catalyst support 13 and thence over the finned tubes 29 of the heat exchanger where they are cooled or heated, depending upon whether the reaction is exothermic or endothermic. A minor proportion of the total fluids passing over the heat exchanger is withdrawn through the product outlet 36 and passed to suitable product recovery equipment shown in Figure 4. A major portion of the fluids passing over the heat exchanger are drawn upwardly by the circulating means through the duct 19 where they are mixed with fresh fluid reactants and again circulated through the catalyst bed and over the heat exchanger. The circulation of fluids within each compartment is controlled independently by suitable positioning of the vane or damper 33 which may be actuated by means responsive to the reaction temperature in such manner that should the reaction temperature in any of the compartments rise above or fall below a predetermined value the circulation of fluids within the compartment will be increased or decreased and the temperature consequently restored to the correct value.

The process and apparatus provided by the invention are particularly suitable for the synthesis of normally liquid hydrocarbons from carbon monoxide and hydrogen in the presence of a catalyst. This reaction is highly exothermic and unless the heat of reaction is sufficiently removed and the reaction temperature held below a certain maximum, the reaction tends to get out of control. Suitable catalysts for the above reaction are iron, cobalt or nickel, which may be promoted with materials such as thoria, alumina, etc., or may be unpromoted, as desired. The catalysts may be supported or unsupported and may be in the form of pellets or granules. These catalysts are well known in the art and need no further description here. Temperatures of the reaction may vary over a relatively wide range, say from about 400° to 650° F., depending upon the particular catalyst employed. The pressure may vary from atmospheric to about 500 pounds per square inch gauge. After leaving the catalyst bed, the gases are cooled somewhat, say from 10° to 100° F., and sufficient gas is recirculated together with fresh synthesis gas to absorb the heat of reaction and thus maintain the catalyst bed and the reaction within the desired temperature limits.

Referring now to Figure 4 of the accompanying drawings, which is a schematic diagram illustrating the application of the process and apparatus of the invention to the synthesis of hydrocarbons as just described, fresh synthesis gas, comprising a suitable mixture of carbon monoxide and hydrogen, enters the system through conduit 40 and passes through the section 41a of heater 41 where it is preheated to the desired temperature. Ordinarily, preheating of the synthesis gas is required only when starting up the process; after equilibrium has been established heater 41a may be shut down or by-passed. The synthesis gas passes from heater 41a to the reactor 42 through conduit 43, entering each of the compartments of the reactor through valves 44. Within each of the compartments of the reactor, the fresh synthesis gas is mixed with recirculated gas, circulated through the catalyst bed and over the heat exchanger and back to the circulating means through the duct as previously described. The heat transfer medium is circulated through the heat exchangers within the reactor through conduits 45 and 46 by means of pump 47. A steam drum or other type of heat exchanger 48 permits recovery of the heat content of the heat transfer medium. The reaction products are withdrawn from the reactor through valves 49 into conduit 50 and pass through steam generator 51 which serves as a heat exchanger wherein the heat content of the product is recovered in useful form. The products leaving the steam generator through conduit 52 are passed through heat exchanger 53, cooler 54, and conduit 55 to a separator 56 where they are allowed to stratify. The subnatant aqueous layer is drawn off through conduit 57, and the liquid hydrocarbon layer is passed through conduit 58 to section 41b of heater 41 where it is vaporized. The vapor portion of the product in the separator is withdrawn through conduit 59, a portion being led to the absorber 60 through conduit 61 and the remainder being recycled back to the fresh synthesis gas inlet through conduit 62 and pump 63. From the heater 41 the vaporized hydrocarbon products pass through conduit 64 to a fractionator 65. The low-boiling or "gasoline" fraction leaving the top of the fractionator through conduit 66 is condensed in cooler 67 and passed to separator 68. The aqueous layer of the condensate within the separator is drawn off and passed to storage for the recovery of water-soluble oxygenated products, and any uncondensed vapors are passed to the absorber 60 through conduit 69. The hydrocarbon condensate is withdrawn from the separator through conduit 70, a portion being returned through conduit 71 to the fractionator to provide reflux and the remainder being passed to storage through conduit 72. The "kerosene" and "gas oil" fractions taken from the fractionator are passed to stripping columns 73 and 74, respectively, where they are stripped with steam, and are then cooled and passed to storage. The vapor products from the stripping columns are returned to the fractionator. An "absorption oil" fraction is taken from the fractionator through conduit 75 and is cooled in cooler 76 and passed through conduit 77 to the absorber 60 where it is employed to wash the vapor products taken from the separator 56. Unabsorbed vapors are taken from the absorber as residue gas through conduit 78 and the "absorption oil" containing dissolved vapor products is returned to the fractionator through conduit 79. The heavy bottoms fraction taken from the fractionator is condensed in cooler 80 and passed to storage.

While the apparatus provided by the invention has been described and illustrated as comprising a number of separate compartments, each of which comprises a closed reaction zone having inlet and outlet means, an internally mounted catalyst bed support, an internally mounted heat exchanger, and internally mounted circulating means for circulating fluid reactants through the catalyst bed and over the heat exchanger back to the circulating means, the apparatus may comprise but a single one of such compartments. However, it is preferable that the reactor comprise a number of such compartments arranged as previously shown, since greater efficiency of operation and greater ease of temperature control is thereby secured. Moreover, such reactor may be operated satisfactorily in spite of temporary mechanical failure of one or more of the circulators or failure of the catalyst in one or more of the compartments.

Many variations are permitted in the construction of the reactor. For example, the heat exchange means has been shown located below the catalyst bed, although if desired it may be mounted to the side of the catalyst bed or within the duct. Similarly, the prime mover for the circulating means may be of such nature, e. g., a steam turbine, that it can be mounted inside the shell 10 thereby eliminating the stuffing boxes for the shafts. Also, the circulating means may be located anywhere within duct 20, and if desired vanes or baffles may be mounted in the upper portion of the compartment to direct the circulated fluids down onto the catalyst bed.

The process and reactor herein described are adapted for use in any chemical reaction employing a solid catalyst and involving the removal or supply of large amounts of heat from or to the reaction zone. The reactants need not be gaseous but may also be liquids. Thus, in addition to the synthesis of normally liquid hydrocarbons from carbon monoxide and hydrogen, the present process and reactor may be used for regeneration by oxidation of cracking catalysts contaminated by carbon, or for such liquid-phase operations as the isomerization of hydrocarbons.

The use of the process and reactor herein described materially reduces the equipment necessary for a process wherein large amounts of fluid reactants are recirculated for temperature control, and minimizes the amount of energy required for circulating such fluids. Substantially the only mechanical work required is that necessary for passing the reactant fluids through the catalyst bed. Furthermore, since separate heat exchange means and independently operating circulating means are provided for each catalyst bed, the temperature within each catalyst bed is readily controlled independently of that within the other beds.

Oother modes of applying the principle of my invention may be employed instead of those explained, change being made as regards the steps or means employed, provided the process or apparatus stated by any of the following claims, or the equivalent of such stated process or apparatus, be employed or obtained.

I, therefore, particularly point out and distinctly claim as my invention:

1. Apparatus for conducting catalytic chemical reactions comprising a closed shell, horizontally disposed perforate catalyst supporting means within said shell, said catalyst supporting means extending over a major portion of a horizontal cross section of said closed shell and being in contact with a major portion of a perimeter of the wall of said shell, a normally closed opening adjacent to said catalyst supporting means in the wall of said shell adapted for charging solid catalyst to and discharging solid catalyst from said catalyst supporting means, tubular heat exchange means positioned below said catalyst supporting means, a duct formed in part by the shell wall and in part by a vertical wall adjacent to an edge of said catalyst supporting means leading from below said tubular heat exchange means and extending horizontally above said catalyst supporting means, inlet means adapted for introducing fresh fluid reactants into said duct, outlet means adapted for withdrawing fluid products from the bottom of said shell, and impeller type circulating means disposed within said duct adapted to circulate fluid reactants downwardly through said catalyst supporting means, over said heat exchange means, and through said duct back to said impeller type circulating means.

2. Apparatus for conducting catalytic chemical reactions comprising a closed vertical shell, horizontally disposed catalyst supporting means within said shell, said catalyst supporting means extending over a major portion of a horizontal cross section of said closed shell and being in contact with a major portion of a perimeter of the wall of said shell, indirect heat exchange means extending horizontally within said shell and positioned below said catalyst supporting means, a duct formed in part by the shell wall and in part by a vertical wall adjacent to an edge of said catalyst supporting means, said duct leading from below said heat exchange means to above said catalyst supporting means, impeller type circulating means disposed adjacent to the upper exit of said duct adapted to circulate fluid reactants within said closed shell downwardly through said catalyst supporting means, over said heat exchange means, and through said duct back to said impeller type circulating means, inlet means disposed in advance of said impeller type circulating means adapted for introducing fresh fluid reactants, outlet means disposed below said heat exchange means adapted for withdrawing fluid products from said shell, and means co-operating with said duct for regulating the circulation of fluid reactants within said closed shell.

3. Apparatus for conducting catalytic chemical reactions comprising a closed vertical shell, horizontally disposed catalyst supporting means within said shell, said catalyst supporting means extending over a major portion of a horizontal cross section of said closed shell and being in contact with a major portion of a perimeter of the wall of said shell, indirect heat exchange means extending horizontally within said shell and positioned below said catalyst supporting means, a normally closed opening adjacent to said catalyst supporting means in the wall of said shell adapted for charging solid catalyst to and discharging solid catalyst from said catalyst supporting means, a duct formed in part by the shell wall and in part by a vertical wall adjacent to an edge of said catalyst supporting means, said duct leading from below said heat exchange means to above said catalyst supporting means, impeller type circulating means disposed adjacent to the upper exit of said duct, said impeller type circulating means having rotating blades disposed within the horizontal portion of the duct and adapted to introduce fluids horizontally above said catalyst supporting means, over said heat exchange means, and through said duct back to said impeller type circulating means, inlet means disposed in advance of said impeller type circulating means adapted for introducing fresh fluid reactants, outlet means disposed below said heat exchange means adapted for withdrawing fluid products from said shell, and temperature sensitive regulating means co-operating with said duct adapted to regulate the circulation of fluid reactants in said shell responsive to the temperature in said shell.

4. Apparatus for conducting catalytic chemical reactions comprising: a vertical shell closed at both ends thereof divided along its length into a plurality of non-communicating compartments; horizontally disposed perforate catalyst supporting means within each of said compartments; indirect heat exchange means extending horizontally within said shell and positioned below said catalyst supporting means in each of said compartments; a duct in each of said compartments formed in part by the wall of said compartment and communicating from below said heat exchange means to above said catalyst supporting means in each of said compartments; inlet means adapted for introducing fluid reactants into each of said ducts; outlet means adapted for withdrawing fluid products from below said heat exchange means; impeller type circulating means disposed adjacent the upper exit of said duct adapted to circulate fluid reactants downwardly through said catalyst supporting means, over said indirect heat exchange means, and through said duct back to said impeller type circulating means; and means co-operating with each of said ducts for regulating the circulation of fluid reactants within each of said compartments; each of said compartments constituting a separate operating unit whereby one or more of the said compartments may be closed down while the remaining compartments continue to operate.

5. Apparatus for conducting catalytic chemical reactions comprising: a vertical shell closed at both ends thereof divided along its length into a plurality of non-communicating compartments; horizontally disposed perforate catalyst supporting means within each of said compartments; a normally closed opening in each of said compartments adjacent to each of said catalyst supporting means adapted for charging solid catalyst to and discharging solid catalyst from said catalyst supporting means; tubular heat exchange means positioned below said catalyst supporting means in each of said compartments; a duct adjacent to the compartment wall in each of said compartments communicating from below said heat exchange means to above said catalyst supporting means in each of said compartments; inlet means adapted for introducing fluid reactants into each of said ducts; outlet means adapted for withdrawing fluid products from below said heat exchange means; and impeller type circulating means disposed within each of said ducts, adapted to circulate fluid reactants downwardly through said catalyst supporting means, over said tubular heat exchange means, and through said duct back to said impeller type circulating means; each of said compartments constituting a separate operating unit whereby one or more of the said compartments may be closed down while the remaining compartments continue to operate.

6. Apparatus for conducting catalytic chemical reactions comprising: a vertical cylindrical shell closed at both ends thereof and divided along its length into a plurality of non-communicating compartments; horizontally disposed catalyst supporting means within each of said compartments, said catalyst supporting means extending over a major portion of a horizontal cross section of each of said compartments and being in contact with a major portion of a perimeter of the wall of each of said compartments; a normally closed opening adjacent to said catalyst supporting means in the wall of each of said compartments adapted for charging solid catalyst to and discharging solid catalyst from said catalyst supporting means; indirect heat exchange means extending horizontally within each of said compartments and positioned below the catalyst supporting means in each of said compartments; a duct in each of said compartments formed in part by the wall of said compartment and in part by a vertical wall adjacent to an edge of said catalyst supporting means, said duct communicating from below said heat exchange means to above said catalyst supporting means; inlet means adapted for introducing fluid reactants into each of said ducts; outlet means adapted for withdrawing fluid products from below said tubular heat exchange means; and impeller type circulating means disposed within each of said ducts adjacent to the upper exit of said duct adapted to circulate fluid reactants downwardly through said catalyst supporting means, over said heat exchange means, and through said duct back to said impeller type circulating means; each of said compartments constituting a separate operating unit whereby one or more of the said compartments may be closed down while the remaining compartments continue to operate.

7. Apparatus for conducting catalytic chemical reactions comprising: a vertical cylindrical shell closed at both ends thereof and divided along its length into a plurality of non-communicating compartments; horizontally disposed catalyst supporting means within each of said compartments, said catalyst supporting means extending over a major portion of a horizontal cross section of each of said compartments and being in contact with a major portion of a perimeter of the wall of each of said compartments; a normally closed opening adjacent to said catalyst supporting means in the wall of each of said compartments adapted for charging solid catalyst to and discharging solid catalyst from said catalyst supporting means; tubular heat exchange means extending horizontally within each of said compartments and positioned below the catalyst supporting means in each of said compartments; a duct in each of said compartments having a vertical section and a horizontal section; said vertical section being formed in part by the wall of said compartment and in part by a vertical wall adjacent to an edge of said catalyst supporting means, said duct communicating from below said tubular heat exchange means to above said catalyst supporting means; inlet means adapted for introducing fluid reactants into each of said ducts; outlet means adapted for withdrawing fluid products from below said tubular heat exchange means; impeller type circulating means disposed within each of said ducts adjacent to the upper exit of said duct, said impeller type circulating means having blades disposed within the horizontal section of the duct adapted to circulate fluids through said catalyst supporting means, over said tubular heat exchange means, and through said duct back to said impeller type circulating means; and temperature sensitive regulating means co-operating with each of said ducts, adapted to regulate the circulation of fluid reactants through each of said compartments responsive to the temperature in each of said compartments; each of said compartments constituting a separate operating unit whereby one or more of the said compartments may be closed down while the remaining compartments continue to operate.

JOEL H. HIRSCH.

REFERENCES CITED

The following references are of record in the file of this patent:

UNITED STATES PATENTS

| Number | Name | Date |
|---|---|---|
| 1,252,976 | Wells | Jan. 18, 1918 |
| 2,260,153 | Nofsinger | Oct. 21, 1941 |
| 2,301,044 | Heard et al. | Nov. 3, 1942 |
| 2,384,874 | Barr | Sept. 18, 1945 |
| 2,411,760 | Sensel | Nov. 26, 1946 |
| 2,433,255 | Atwell | Dec. 23, 1947 |